United States Patent
Lee et al.

(10) Patent No.: US 9,319,785 B2
(45) Date of Patent: Apr. 19, 2016

(54) TECHNIQUE FOR LOCALIZING SOUND SOURCE

(75) Inventors: Jong Hyun Lee, Gyeonggi-do (KR); Myung Han Lee, Gyeonggi-do (KR); Mun Hwan Cho, Gyeonggi-do (KR); Kang Duck Ih, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1048 days.

(21) Appl. No.: 13/424,869

(22) Filed: Mar. 20, 2012

(65) Prior Publication Data

US 2013/0147835 A1 Jun. 13, 2013

(30) Foreign Application Priority Data

Dec. 9, 2011 (KR) .......................... 10-2011-0131710

(51) Int. Cl.
| | |
|---|---|
| *H04R 3/00* | (2006.01) |
| *G01S 3/808* | (2006.01) |
| *H04R 1/40* | (2006.01) |
| *H04R 29/00* | (2006.01) |

(52) U.S. Cl.
CPC ................. *H04R 3/005* (2013.01); *G01S 3/808* (2013.01); *H04R 1/406* (2013.01); *H04R 29/008* (2013.01); *H04R 2201/401* (2013.01); *H04R 2430/20* (2013.01); *H04R 2499/13* (2013.01)

(58) Field of Classification Search
CPC ........................... H04R 2201/401; G01S 3/808
See application file for complete search history.

(56) References Cited

U.S. PATENT DOCUMENTS

| | | | | |
|---|---|---|---|---|
| 2002/0181721 | A1* | 12/2002 | Sugiyama et al. | ............... 381/92 |
| 2005/0150299 | A1 | 7/2005 | Wu | |
| 2006/0126852 | A1 | 6/2006 | Bruno et al. | |
| 2006/0239465 | A1 | 10/2006 | Montoya et al. | |
| 2010/0316231 | A1* | 12/2010 | Williams | ........................ 381/92 |

FOREIGN PATENT DOCUMENTS

| | | |
|---|---|---|
| JP | 57-097473 A | 6/1982 |
| JP | 2006500809 A | 1/2006 |
| JP | 2006506918 A | 2/2006 |
| JP | 2010-091282 A | 4/2010 |
| KR | 1020050058467 A | 6/2005 |

(Continued)

OTHER PUBLICATIONS

M.A. Poletti, AES Member, "Three-Dimensional Surround Sound Systems Based on Spherical Harmonics"; J. Audio Eng. Soc., vol. 53, No. 11; Nov. 2005.

(Continued)

*Primary Examiner* — Luke Ratcliffe
*Assistant Examiner* — Hovhannes Baghdasaryan
(74) *Attorney, Agent, or Firm* — Mintz Levin Cohn Ferris Glovsky and Popeo, P.C.; Peter F. Corless

(57) ABSTRACT

Disclosed is a technique for localizing a sound source. In the technique, a sound pressure signal measured by microphones is acquired using a spherical microphone array sensor where the microphones are fixedly arranged on a surface of a spherical body. A sound pressure distribution on the surface of the spherical body is obtained by a controller from a sound pressure calculation formula for calculating a sound pressure at a certain location of a spherical surface using the sound pressure signal measured by the microphones as an input value. A location of the sound source is estimated from the obtained sound pressure distribution.

8 Claims, 8 Drawing Sheets

(56) References Cited

FOREIGN PATENT DOCUMENTS

| KR | 10-1021895 | 7/2005 |
| KR | 10-0964353 | 8/2005 |
| KR | 10-2006-0121807 | 11/2006 |
| WO | 2004/021031 A1 | 3/2004 |

OTHER PUBLICATIONS

S. Choi et al., "A study on the sound source localization using spherical harmonic decomposition", Department of Aerospace Engineering, Graduate School, Chungnam National University, Feb. 2011. (English Abstract).

* cited by examiner

LOCATION OF ACTUAL SOUND SOURCE

LOCATIONS OF SOUND SOURCE CANDIDATES

- CONVER INTO SPL DATA ON A PLANE
- $\dfrac{P_i - P_{min}}{P_{max} - P_{min}} \times 255$

RELATED ART

LOCATION REGION OF SOUND　　　　LOCATION REGION OF SOUND
SOURCE ESTIMATED FROM　　　　　SOURCE ESTIMATED FROM
BEAM POWER DISTRIBUTION　　　　SOUND FIELD DISTRIBUTION
　　　　　　　　　　　　　　　　ON SPHERICAL SURFACE

PRESENT INVENTION

TECHNIQUE FOR LOCALIZING SOUND SOURCE

CROSS-REFERENCE TO RELATED APPLICATION

This application claims under 35 U.S.C. §119(a) the benefit of Korean Patent Application No. 10-2011-0131710 filed Dec. 9, 2011, the entire contents of which are incorporated herein by reference.

BACKGROUND (a) Technical Field

The present invention relates to a technique for localizing a sound source. More particularly, it relates to a technique for localizing a sound source, which can estimate sound pressure distribution with respect to a low frequency noise source, and can improve the resolution of sound field visualization with respect to the low frequency noise source.

(b) Background Art

As the noise characteristics of various products such as vehicles and home appliances are recognized as an important performance indicator, efforts to manufacture products producing less noise have been made at the development stage. A method of finding the location and the cause of noise generation and reducing noise through design modification is being used to reduce noise of products as well. For this, a measurement technique which finds the location of a noise source is primarily needed.

Recently, a method of measuring the intensity of a sound pressure using an intensity probe and a method of localizing a sound source using a microphone array beam forming method have been widely used.

A method of localizing a sound source using a spherical microphone array, which has been relatively recently developed, uses a microphone that includes a plurality of noise-measuring sensors, and utilizes a technique of calculating the intensity distribution of a noise source through signal processing using the phase difference of measured signals according to a distance difference between the noise source and the noise-measuring sensor and localizing the location of the noise source according to the intensity of the noise source. The measurement accuracy of the beam forming method is determined by the number of the sensors used. Generally, it is known that more sensors improve its performance.

On the other hand, a method for measuring the location of a noise source and visualizing a sound field in an interior space of a vehicle includes estimating the location of a noise source via a beam forming method, acquiring an omnidirectional (360 degrees) image of the interior space of the vehicle where the noise source exists using a plurality (e.g., twelve) of image sensors or image capturing devices (e.g., cameras), and displaying the location of the noise source obtained by the beam forming method on the omnidirectional image acquired by the image sensors.

A spherical microphone array used for localization of a noise source is disclosed in Korean Patent Application No. 2011-0093086, filed on Sep. 15, 2011 by the present applicant and inventor and is hereby incorporated by reference in its entirety.

FIG. 1 is a view illustrating a typical beam forming method using a spherical microphone array. For localization of a noise source using a spherical microphone array sensor 10, a plurality of microphones 12 are fixedly arranged on the surface of a spherical body 11. In the beam forming method, beam power is obtained to localize a sound source. The location of an actual sound source 21 is estimated by calculating a time delay between the location of each sound source candidate and each microphone 12 on the surface of the spherical body 11. In this case, an interrelation (beam power) between the sound pressure signals of each microphone 12 and the sound pressure signals at the locations of each sound source candidate is calculated, and the highest location is estimated to be the location of the actual sound source 21.

In the typical beam forming method, beam power needs to be calculated, and the location of a noise source is estimated by controlling the time delay between sound pressure signals received by each microphone. The beam power can be expressed as Equation (1) below.

$$z(\vec{k}, t) = \sum_{m=1}^{M} p_m(t - \Delta_m(\vec{k})) \quad (1)$$

where $z(\vec{k},t)$ is a beam power, m and M denote a microphone index and the total number of microphones, respectively, $\Delta_m(\vec{k}) = \vec{k} \cdot \vec{r}_m/c$ is a time delay, $\vec{k}$ is a traveling direction of a sound wave, $\vec{r}_m$ is a distance from a reference point to m-th microphone, and c is a propagation velocity of a sound wave in the air.

However, in the above delay-sum beam forming technique, there is a limitation in localization of a low frequency noise source (i.e., equal to or less than about 500 Hz) that has a sufficiently long wavelength compared to an interval between microphones adjacent to each other in the microphone array. This limitation inevitably occurs in the delay-sum beam forming technique. In the case of a low frequency noise source, when a typical beam forming method is used, the resolution is reduced due to a reduction of visualization performance, causing a limitation in the localization of the noise source.

FIG. 2 is a view illustrating a limitation of a typical method. When a spherical microphone array having a specific radius a is used, as shown in FIG. 2, the localization of a noise source is difficult at a low frequency band (e.g., a low ka region equal to or less than about 500 Hz).

Accordingly, an acoustic holography technique may be used to overcome the above limitation. Also known is a commercialized technology (acoustic holography technology for a spherical microphone array) that uses a spherical harmonic function in sound field visualization for a spherical microphone array). In the acoustic holography technique, the sound field estimation is performed using a spherical harmonic function when r≥a. However, in the above acoustic holography technique, only near field estimation is possible due to a limitation on the numerical formula. When a typical acoustic holography is used, frequent measurement (e.g., more than 15 times in the case of the indoor of a vehicle) is needed for the sound field visualization. Accordingly, a lot of numerical calculations are needed, and therefore analysis is delayed.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a technique for localizing a sound source, which can estimate a sound pressure distribution with respect to a low frequency noise source, and can improve the resolution of sound field visualization with respect to the low frequency noise source. The present invention also provides a technique for localizing a sound source, which can reduce the measurement frequency and time, and the amount of calculation, compared to a typical acoustic holography technique.

In one aspect, the present invention provides a method for localizing a sound source, including: acquiring a sound pressure signal measured by microphones, using a spherical microphone array sensor where the microphones are fixedly arranged on a surface of a spherical body; obtaining a sound pressure distribution on the surface of the spherical body from a sound pressure calculation formula for calculating a sound pressure at a certain location of a spherical surface using the sound pressure signal measured by the microphones as an input value; and estimating a location of the sound source from the obtained sound pressure distribution.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
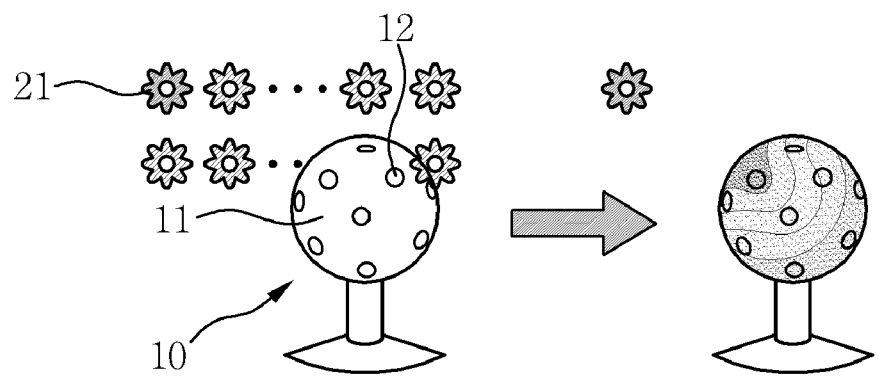
FIG. 1 is a view illustrating a typical beam forming method using a spherical microphone array.
Figure 1:
Figure 1:
Figure 2:
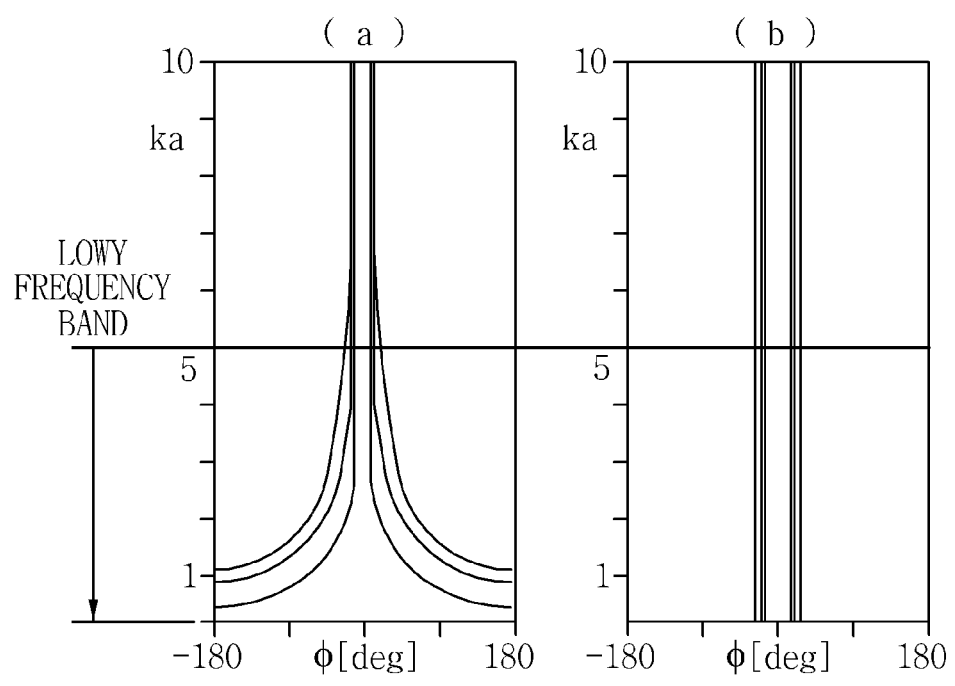
FIG. 2 is a view illustrating a limitation of a typical method.

Reference numerals set forth in the Drawings includes reference to the following elements as further discussed below:

10: spherical microphone array sensor
11: spherical body
12: microphone
21: location of actual sound source It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiment of the present invention will be described in detail with reference to the accompanying drawings.

Figure 3:
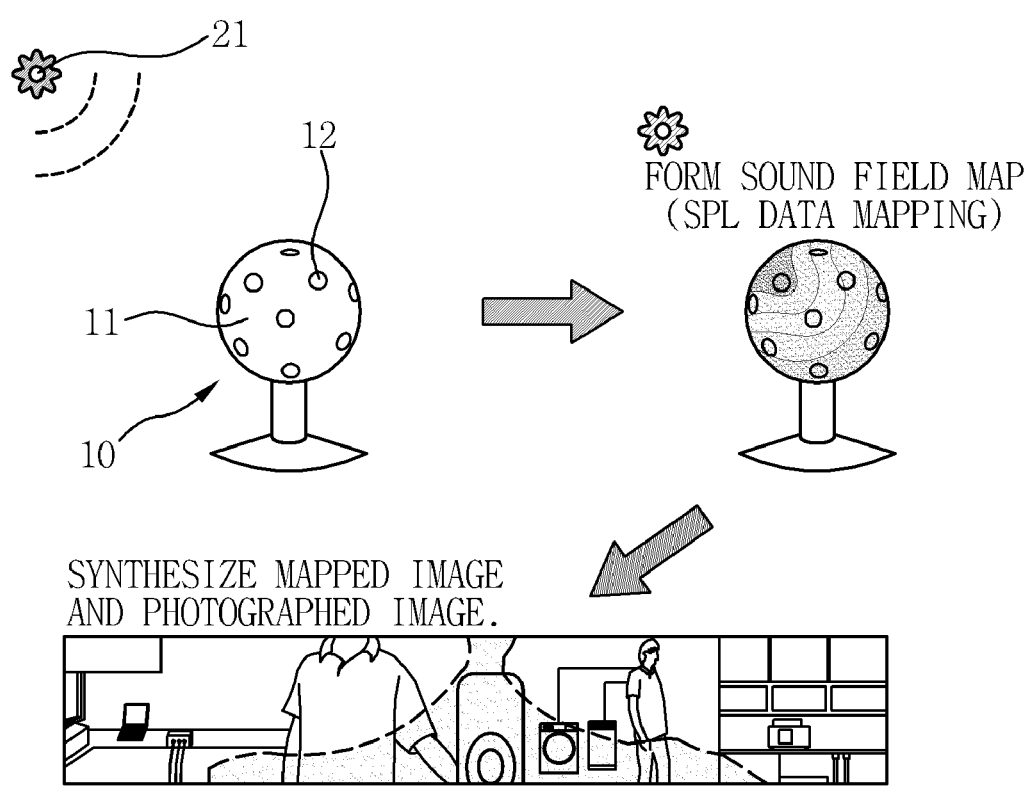
FIG. 3 is a view illustrating a method for estimating a sound field (sound pressure) distribution according to an exemplary embodiment of the present invention.

FIG. 3 is a view illustrating a method for localizing a sound source and estimating a sound field (sound pressure) distribution according to an embodiment of the present invention. As shown in FIG. 3, a spherical microphone array sensor 10 where a plurality (e.g., thirty) of microphones 12 are fixedly arranged may be provided to localize a noise source. When the spherical microphone array sensor 10 is disposed within an interior space of a vehicle, and sound pressure signals measured by each microphone 12 are used, as described below, a sound pressure distribution on a spherical surface (e.g., a surface of the spherical body of the sensor) may be obtained, and a noise source in the indoor space of the vehicle may be localized from the obtained sound pressure distribution.

The localization of the noise source may include estimating the location of a sound source from sound pressure levels at each location of the obtained sound pressure distribution. In the localization of the noise source, the obtained sound pressure distribution may be converted and mapped into Sound Pressure Level (SPL) data at each location on a rainbow palette, and then may be displayed on a separately-photographed omnidirectional planar image of the indoor space of a vehicle to obtain a visualized image of an area where the noise source is located.

Specifically, the omnidirectional (i.e., 360 degrees) planar image of the indoor space (i.e., surroundings of the sensor) of a vehicle where a noise source exists may be separately obtained using a plurality (e.g., twelve) of image sensors or image capturing devices (e.g., cameras), and then a sound pressure distribution on the spherical surface obtained by the spherical microphone array sensor 10 may be converted into SPL data and mapped on the rainbow palette. Thereafter, the rainbow palette where the SPL data are mapped may be synthesized with the omnidirectional planar image to obtain an image that visualizes the locational area of the noise source.

The technique for localizing of the sound source according to the exemplary embodiment of the present invention is characterized in that the sound pressure (sound field) distribution on the spherical surface is directly estimated without calculation of beam power using sound pressure signals measured by each spherical microphone 12 and then the sound source is localized.

Particularly, the technique for localizing of the sound source may accurately localize a low frequency (e.g., equal to or less than about 500 Hz) noise source. In order to localize a low frequency noise source, the sound pressure distribution on the spherical surface (surface of the spherical body where microphones are arranged) may be estimated using the sound pressure signals measured from the surface of the spherical microphone array sensor 10.

In this case, the sound pressure distribution on the spherical surface may be estimated using a spherical harmonic function with respect to a low frequency range of noise source (see Equations 4 and 6 below). It is estimated whether a noise source exists at a certain place distant from the estimated sound pressure distribution. After the sound pressure distribution on the spherical surface is estimated using the sound pressure measured on the surface of the spherical microphone array sensor 10, the sound source may be localized based on the estimated sound pressure distribution. Thus, it is possible to accurately estimate the sound pressure distribution and localize a low frequency noise source compared to a typical beam forming method.

Also, it is possible to reduce the measurement frequency and time, and the amount of calculation compared to a typical acoustic holography technique. More specifically, as shown in FIG. 1, the sound pressure may be measured by each microphone 12 arranged on the spherical body 11 of the spherical microphone array sensor 10, and then the sound pressure distribution on the spherical surface may be estimated from Equation (6) below based on the sound pressure signals measured with respect to each microphone. In this case, it is necessary to assume that the sound field includes a large number of combinations of planar waves.

Also, since the rigid body spherical microphone array sensor 10 is used, although considered to be an intrinsic limitation, the sound field may be expressed as Equation (2) below when the radius (radius of the spherical body) of the sphere, i.e., the spherical microphone array sensor 10 is equal to or greater than a (i.e., r≥a).

[Sound Pressure Signal at a certain location (θ, φ) when r≥a]

$$p(r, \theta, \phi, \omega) = \sum_{n=0}^{\infty} \sum_{m=-n}^{n} A_{mn}(\omega) j_n(kr) Y_n^m(\theta, \phi) \quad (2)$$

where $j_n(kr)$ is a spherical Bessel function, n is an order of sound field distribution, m={−n, −n+1, . . . , 0, 1, . . . , n−1, n}, $Y_n^m(\theta, \phi)$ are spherical harmonic functions, and to is an angular frequency (rad/s).

Figure 7:
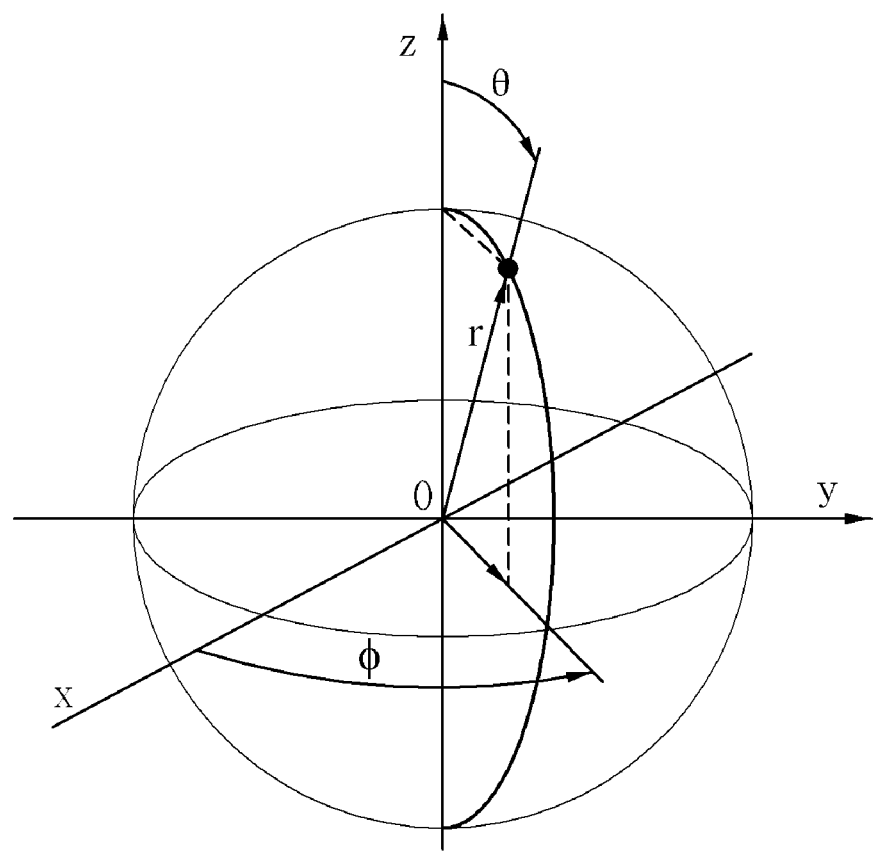
FIG. 7 is a view illustrating parameters of a spherical coordinate.

In Equation (2), (r, θ, φ) denotes parameters on a spherical coordinate shown in FIG. 7, r denotes the radius of a sphere, θ denotes the horizontal angle of the spherical coordinate, and φ denotes the vertical angle of the spherical coordinate. Also, m represents a sound field distribution mode of n sound distribution order, and is different from the microphone index m of Equation (1).

The coefficient Amn of Equation (2), which is a function with respect to the frequency, may be expressed as Equation (3) with respect to one frequency. In this case, $p(a,\theta_0,\phi_o)$ may be obtained from each microphone 12.

$$A_{mn} = \frac{1}{j_n(ka)} \int_0^{2\pi} \int_0^{\pi} p(a, \theta_0, \phi_o) Y_n^m(\theta_0, \phi_0)^* \sin\theta d\theta d\phi \quad (3)$$

where $\theta_0,\phi_o$ represented to obtain Amn denotes a location of each microphone 12 in the sensor 10, and a is a radius (i.e., radius of spherical body) of the spherical microphone array sensor 10 where microphones 12 are arranged on the surface of the spherical body. Thus, based on the sound pressure signals measured by the plurality (e.g., thirty) of microphones 12, the coefficient Amn may be mathematically obtained. This means that the sound pressure distribution (i.e., sound field distribution) on the spherical surface can be analytically estimated from the coefficient Amn. Thus, it is possible to estimate the sound pressure distribution on the spherical and estimate the direction and location of the sound source on the microphone array.

When obtaining coefficients using Equations (2) and (3), the sound pressure (r≥a) at a certain location (r,θ,φ) of the spherical coordinate may be expressed as Equation (4) below.

[Sound Pressure Signal at a Certain Location]

$$p(r, \theta, \phi) = \quad (4)$$
$$\sum_{n=0}^{\infty} \frac{j_n(kr)}{j_n(ka)} \sum_{m=-n}^{n} Y_n^m(\theta, \phi) \int_0^{2\pi} \int_0^{\pi} p(a, \theta_0, \phi_o) Y_n^m(\theta_0, \phi_0)^* \sin\theta d\theta d\phi$$

where n denotes the order of the sound field, and m denotes a sound field distribution mode of n sound distribution order.

In Equation (4), the sound pressure on a spherical surface (surface of the spherical body of the sensor) means r=a.

Since there is a limitation of unknown quantity generated from the number of the microphones, the sound distribution order n has to be determined such that a smaller number of unknown quantities are generated than the number of the microphones. This relationship may be expressed as Equation (5). For example, when using the spherical microphone array sensor 10 having thirty microphones (M=30), the maximum order N of Equation (5) may be determined to be 4 (the order N is limited to be 4).

[Relationship Between the Number of Microphones and the Order]

$$M \geq (N+1)^2 \quad (5)$$

where M is the total number of microphones, and N is the maximum order.

Thus, when the condition (r=a) of the spherical surface and the order limit condition (n=4) are applied, Equation (6) may be obtained from Equation (5). Finally, the sound pressure distribution on the spherical surface may be estimated from Equation (6) below.

[Sound Pressure Signal (Order Limit)]

$$p(a, \theta, \phi) = \sum_{n=0}^{4} \sum_{m=-n}^{n} Y_n^m(\theta, \phi) \int_0^{2\pi} \int_0^{\pi} p(a, \theta_0, \phi_o) Y_n^m(\theta_0, \phi_0)^* \sin\theta d\theta d\phi \quad (6)$$

Equation (6) may be a sound pressure calculation formula for calculating a sound pressure at a certain location of the spherical surface (surface of the spherical body on which microphones are arranged in a microphone array sensor) using sound pressure signals measured by each microphone 12 as input values. Also, Equation (6) may be obtained by limiting the sound distribution order n to the maximum order (N=4) of Equation 5 that considers the total number of microphones.

In this case, since an actual measured point, i.e., the location $\theta_0, \phi_0$ of the microphone is included in $\theta, \phi$, the sound field may be estimated with respect to all points including the measured point, but the sound field can be estimated at a location of r=a that is the surface of the sphere. Accordingly, after the sound pressure distribution on the surface of the sphere is obtained from Equation 6, the sound source located around the sensor can be localized from the sound pressure distribution on the surface of the sphere, and information for localization of the sound source can be created.

From the obtained sound pressure distribution, the highest level of the sound pressure may be estimated to be a region where the sound source is located. The sound field visualization may be performed to generate an image by which the location of the sound source can be visually identified from the obtained sound pressure distribution. In this case, the sound pressure distribution may be divided by discernible colors and shades according to the level.

In this case, a sound field visualization process may be performed. The sound field visualization process may include dividing the sound pressure distribution by colors (e.g., 8 bit RGB color) and shades by converting the sound pressure distribution on the spherical surface into sound pressure level (SPL) data to map the data on a rainbow palette, and obtaining an image that visualizes the location region of the noise source by synthesizing the mapped image pressure distribution with a photographed image. An example of the sound field visualization that forms an image by which the location of the noise source can be visually identified by displaying the location region of the noise source using the sound pressure distribution will be described below.

First, an omnidirectional image of the indoor space of a vehicle, which is obtained using a plurality of image sensors or cameras and shows surroundings of the spherical microphone array sensor, may be processed into a widely-spread omnidirectional planar image as shown in FIG. 3. Also, a planar image mapped with SPL data may be created by converting the sound pressure distribution on the spherical surface obtained from Equation (6) into SPL data and mapping the data on the rainbow palette.

Figure 4:
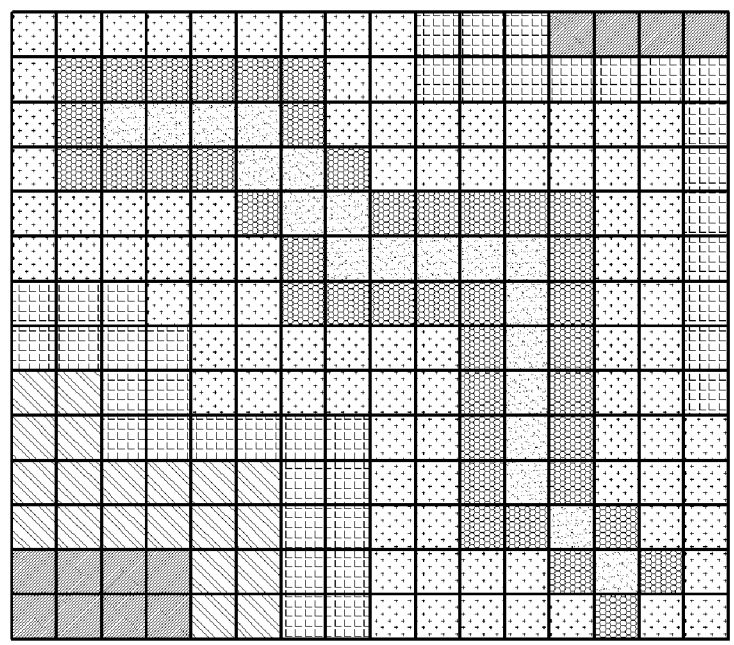
FIG. 4 is a view illustrating a sound pressure distribution converted into sound pressure level data of RGB colors and mapped in corresponding locations of a rainbow palette according to an exemplary embodiment of the present invention.

FIG. 4 is a view illustrating a sound pressure distribution converted into sound pressure level data of RGB colors and mapped in corresponding locations of a rainbow palette according to an embodiment of the present invention. In FIG. 4, the sound pressure Pi at a certain location may be converted into SPL data to be mapped on the rainbow palette using the maximum value Pmax and the minimum value Pmin of the obtained sound pressure.

In this case, the sound pressure may be converted into SPL data having 255 steps to represent measured values on the rainbow palette. The gap between the measured maximum and minimum values may be divided into 255 steps, and a sound pressure at a certain location may be represented as a value therebetween.

Thereafter, the omnidirectional planar image may be matched with the map planar image by pixel location to overlay pixel data. In this case, if the SPL data (for example, converted into colors of FIG. 4) mapped on the rainbow palette is synthesized with the omnidirectional planar image, one image that visualize the location region of the noise source can be obtained.

Figure 5:
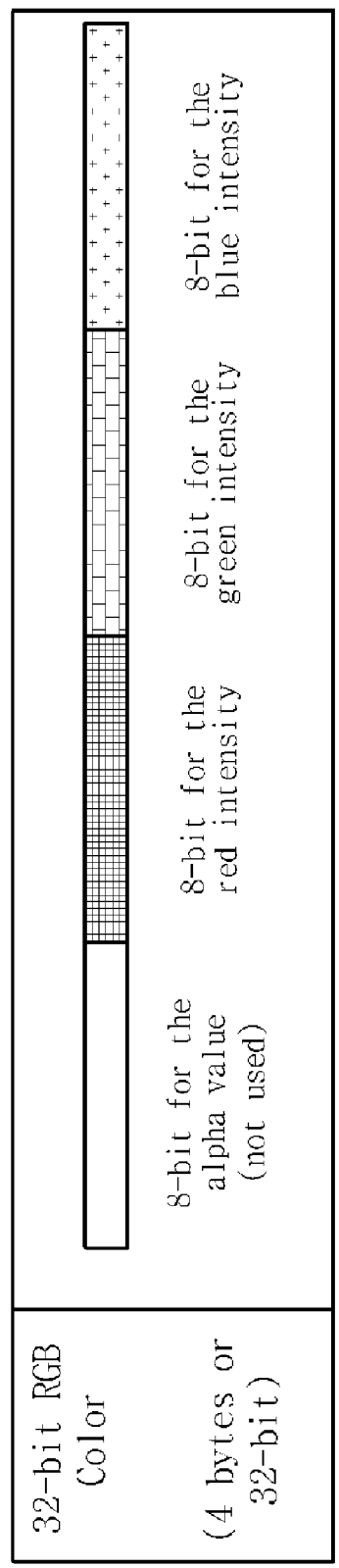
FIG. 5 is a view illustrating a configuration of 32-bit RGB color of a photographed image according to an exemplary embodiment of the present invention.

In overlaying data of the omnidirectional planar image and the rainbow palette mapped with the SPL data, the 32-bit RGB color of the photographed image, as shown in FIG. 5, may include 8-bit alpha, red, green, and blue values. Accordingly, the red, green, and blue (RGB) components, except the alpha value of the photographed image and the RGB components of the rainbow palette mapped with the SPL data, may be separated and combined by each pixel to create a final image (see FIGS. 3 and 8) on which the location of the noise source is displayed.

Figure 6:
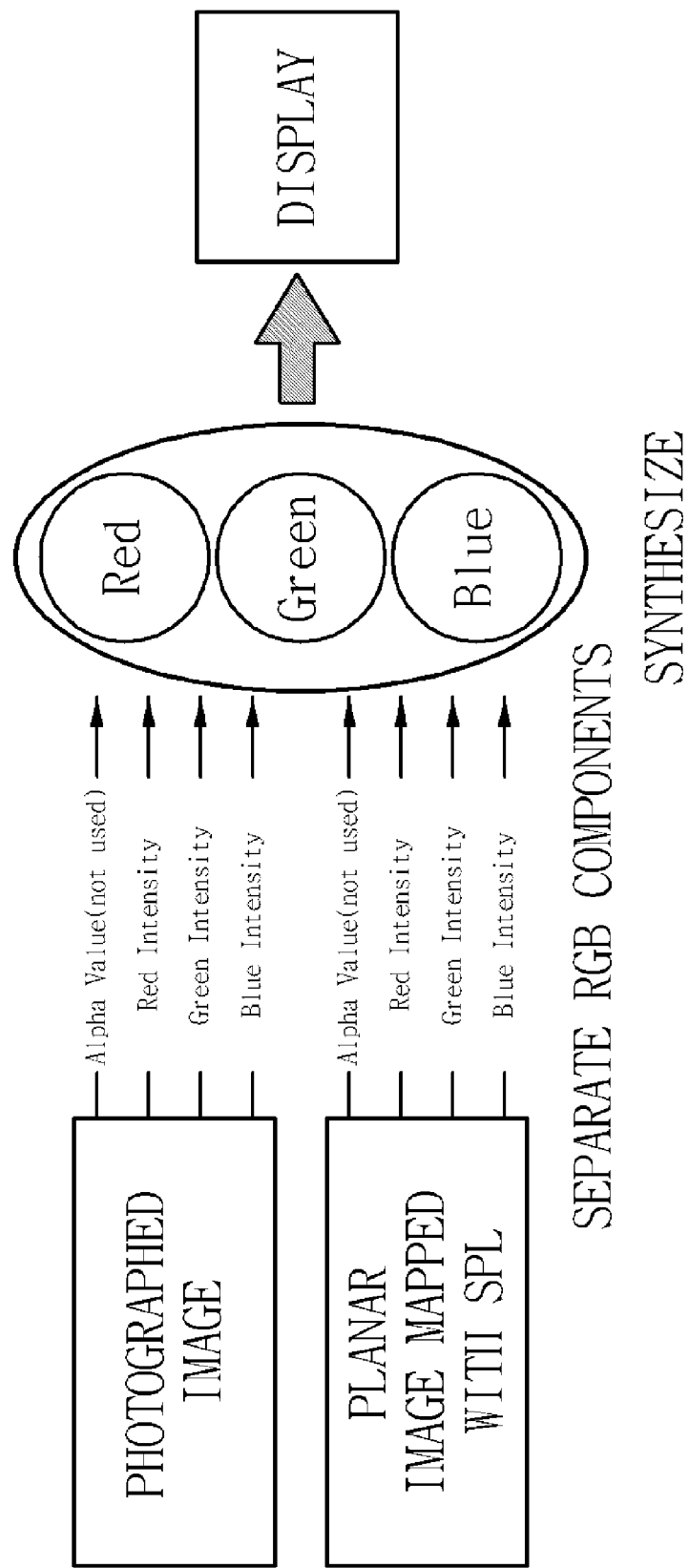
FIG. 6 is a view illustrating a method for obtaining a display image from a photographed image and an image where sound pressure level data are mapped according to an exemplary embodiment of the present invention.

In this case, the color of the planar images may be separated into and expressed by 8-bit data of red, green and blue, respectively. As shown in FIG. 6, the RGB components of red, green and blue of the photographed planar image and the rainbow palette mapped with the SPL data may be separated and summed by components, and then the separated RGB components may be combined with each other to represent an overlay image. Here, the transparency may also be adjusted by multiplying the factor map data by a correction value (0 to 1).

Figure 8:
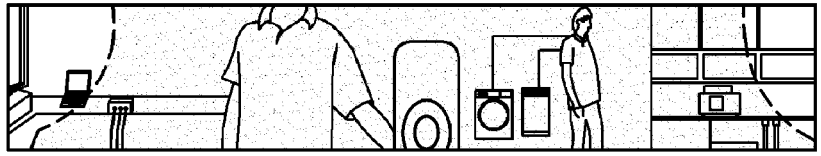
FIG. 8 is a view illustrating a typical sound field display and a sound field display according to an exemplary embodiment of the present invention.
Figure 8:
Figure 8:
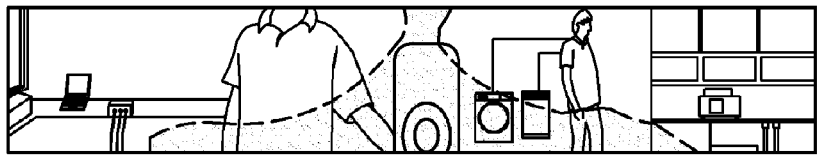

Referring to FIG. 8, as a result of the above visualization process, the location region of the noise source obtained from the sound pressure distribution is shown in the omnidirectional image (as an example of an omnidirectional image, the image of FIG. 8 is not an image of the indoor space of a vehicle). FIG. 8 illustrates a comparison between a typical beam forming method/technique and a method for localizing a sound source according to an embodiment of the present invention. In the method for localizing the sound source, the sound source can be more exactly localized, and more improved visualization resolution can be obtained compared to the typical beam forming method.

Table 1 below shows differences between a typical beam forming method and a method for localizing a sound source according to an embodiment of the present invention.

TABLE 1

| Division | Typical Beam Forming Method | Present Invention |
|---|---|---|
| Beam Power Algorithm | Calculation necessary Adjust time delay by sound pressure signal received by each microphone | Calculation unnecessary Calculate mode constant Amn by mode |
| Expression Value | Beam power | Estimation sound pressure signal |
| Estimation Distance | Capable of estimating even though far away from array | Capable of estimating sound pressure distribution only when relatively close to array. |
| Frequency Range | Related to microphone array | Low frequency (equal to or less than about 500 Hz) |

Thus, a method for localizing a sound source according to an embodiment of the present invention can accurately estimate a sound pressure distribution and localize the sound source with respect to a low frequency noise source compared to a typical beam forming technique, and can improve the resolution of sound field visualization with respect to the low frequency noise source, by estimating a sound pressure distribution on a spherical surface using a sound pressure measured on the surface of a spherical microphone array sensor and then estimating the location of the sound source based on the estimated sound pressure distribution. The technique for localizing the sound source can reduce the measurement frequency and time, and the amount of calculation, compared to a typical acoustic holography technique that performs sound field estimation using a spherical harmonic function when r≥a).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for localizing a sound source, comprising:
acquiring, by a controller, a sound pressure signal measured by microphones, using a spherical microphone array sensor wherein the microphones are fixedly arranged on a surface of a spherical body;
obtaining a sound pressure distribution on the surface of the spherical body from a sound pressure calculation formula for calculating a sound pressure at a certain location of a spherical surface using the sound pressure signal measured by the microphones as an input value; and
estimating a location of the sound source from the obtained sound pressure distribution,
wherein, from Equation (1) below the sound pressure calculation formula is obtained by meeting r=a (here, a is a radius of the spherical body) and limiting a sound field distribution order n to a maximum order N of Equation (2) below that considers a total number of microphones;

$$p(r, \theta, \phi) = \sum_{n=0}^{\infty} \frac{j_n(kr)}{j_n(ka)} \sum_{m=-n}^{n} Y_n^m(\theta, \phi) \int_0^{2\pi} \int_0^{\pi} p(a, \theta_0, \phi_o) Y_n^m(\theta_0, \phi_0)^* \sin\theta d\theta d\phi \quad (1)$$

where $j_n(kr)$ is a spherical Bessel function, n is an order of sound field distribution, m={−n, −n−1, ..., 0, 1, ..., n−1, n}, $Y_n^m(\theta,\phi)$ are spherical harmonic functions, r denotes a radius of a sphere, θ denotes a horizontal angle of a spherical coordinate, φ denotes a vertical angle of the spherical coordinate, $\theta_0$ and $\phi_o$ denote the horizontal angle and the vertical angle of microphone location respectively, and $p(a,\theta_0,\phi_o)$ denotes a sound pressure measured at each microphone location on the surface of the spherical body; and $$M \geq (N+1)^2 \quad (2)$$

where M is a total number of microphones, and N is a maximum order.

2. Method of claim 1, wherein the sound pressure calculation formula is Equation (3) below:

$$p(a, \theta, \phi) = \sum_{n=0}^{4} \sum_{m=-n}^{n} Y_n^m(\theta, \phi) \int_0^{2\pi} \int_0^{\pi} p(a, \theta_0, \phi_o) Y_n^m(\theta_0, \phi_0)^* \sin\theta d\theta d\phi \quad (3)$$

where n is an order of sound field distribution, m={−n, −n+1, ..., 0, 1, ..., n−1, n}, $Y_n^m(\theta,\phi)$ are spherical harmonic functions, a denotes a radius of the spherical body, θ denotes a horizontal angle of a spherical coordinate, φ denotes a vertical angle of the spherical coordinate, $\theta_0$ and $\phi_0$ denote the horizontal angle and the vertical angle of microphone location, respectively, and $p(a,\theta_0,\phi_o)$ denotes a sound pressure measured at each microphone location on the surface of the spherical body.

3. Method of claim 1, wherein the estimating of the location of the sound source comprises estimating the location of the sound source from the sound pressure level at each location of the obtained sound pressure distribution.

4. Method of claim 1, wherein the estimating of the location of the sound source
acquiring an omnidirectional planar image of surroundings of the spherical microphone array sensor using an image sensor or a camera;
converting the obtained sound pressure distribution into sound pressure level data at each location and mapping the data on a rainbow palette; and
overlaying the rainbow palette mapped with the sound level data on the Omnidirectional planar image to obtain an image in which a location region of the sound source is visualized.

5. A system for localizing a sound source, comprising:
a spherical microphone array sensor configured to acquire a sound pressure signal Measured by microphones, wherein the microphones are fixedly arranged on a surface of a spherical body; and
a controller configured to obtain a sound pressure distribution on the surface of the spherical body from a sound pressure calculation formula for calculating a sound pressure at a certain location of a spherical surface using the sound pressure signal measured by the microphones as an input value, and estimate a location of the sound source from the obtained sound pressure distribution,
wherein, from Equation (1) below the sound pressure calculation formula is obtained by meeting r=a (here, a is a radius of the spherical body) and limiting a sound field distribution order n to a maximum order N of Equation (2) below that considers a total number of microphones;

$$p(r, \theta, \phi) = \sum_{n=0}^{\infty} \frac{j_n(kr)}{j_n(ka)} \sum_{m=-n}^{n} Y_n^m(\theta, \phi) \int_0^{2\pi} \int_0^{\pi} p(a, \theta_0, \phi_o) Y_n^m(\theta_0, \phi_0)^* \sin\theta d\theta d\phi \quad (1)$$

where $j_n(kr)$ is a spherical Bessel function, n is an order of sound field distribution, m={−n, −n−1, ..., 0, 1, ..., n−1, n}, $Y_n^m(\theta,\phi)$ are spherical harmonic functions, r denotes a radius of a sphere, θ denotes a horizontal angle of a spherical coordinate, φ denotes a vertical angle of the spherical coordinate, $\theta_0$ and $\phi_o$ denote the horizontal angle and the vertical angle of microphone location, respectively, and $p(a,\theta_0,\phi_o)$ denotes a sound pressure measured at each microphone location on the surface of the spherical body; and $$M \geq (N+1)^2 \quad (2)$$

where M is a total number of microphones, and N is a maximum order.

6. The system of claim 5, wherein the sound pressure calculation formula is Equation (3) below:

$$p(a, \theta, \phi) = \sum_{n=0}^{4} \sum_{m=-n}^{n} Y_n^m(\theta, \phi) \int_0^{2\pi} \int_0^{\pi} p(a, \theta_0, \phi_o) Y_n^m(\theta_0, \phi_0)^* \sin\theta d\theta d\phi \qquad (3)$$

where n is an order of sound field distribution, m={−n, −n+1, ..., 0, 1, ..., n−1, n}, $Y_n^m(\theta,\phi)$ are spherical harmonic functions, a denotes a radius of the spherical body, θ denotes a horizontal angle of a spherical coordinate, φ denotes a vertical angle of the spherical coordinate, $\theta_0$ and $\phi_0$ denote the horizontal angle and the vertical angle of microphone location, respectively, and $p(a,\theta_0,\phi_o)$ denotes a sound pressure measured at each microphone location on the surface of the spherical body.

7. The system of claim 5, wherein is further configured to estimate the location of the sound source from the sound pressure level at each location of the obtained sound pressure distribution.

8. The system of claim 5, wherein the controller is further configured to:
   acquire an omnidirectional planar image of surroundings of the spherical microphone array sensor using an image sensor or a camera;
   convert the obtained sound pressure distribution into sound pressure level data at each location and mapping the data on a rainbow palette; and
   overlay the rainbow palette mapped with the sound level data on the omnidirectional planar image to obtain an image in which a location region of the sound source is visualized.

* * * * *